United States Patent [19]

Bovino

[11] Patent Number: 4,720,932

[45] Date of Patent: Jan. 26, 1988

[54] SWIVEL TYPE GAFF HOOK

[76] Inventor: Alessio Bovino, P.O. Box 454, Fishkill, N.Y. 12524

[21] Appl. No.: 52,993

[22] Filed: May 22, 1987

[51] Int. Cl.$^4$ .................................................. A01K 97/14
[52] U.S. Cl. ............................................... 43/5; 294/26
[58] Field of Search ...................... 43/5, 6; 294/26, 19.3

[56] References Cited

U.S. PATENT DOCUMENTS

| | | | |
|---|---|---|---|
| 1,404,117 | 1/1922 | Hanson | 294/26 |
| 2,570,538 | 10/1951 | Fincher | 294/26 |
| 2,586,245 | 2/1952 | McRae | 294/26 |
| 3,848,689 | 11/1974 | Hilterhaus | 294/26 |
| 3,863,377 | 2/1975 | Leonard | 43/6 |
| 3,991,502 | 11/1976 | Tudisco | 43/5 |

Primary Examiner—Gene P. Crosby
Attorney, Agent, or Firm—John F. Ohlandt

[57] ABSTRACT

A gaff hook includes a rod member with a pointed hook part and a shank part terminating in a top end. A first collar is fixed coaxially to the shank part near the top end, and a second collar has an axial bore which recieves a top end portion of the shank part to allow rotational movement of the second collar relative to the shank part. The first and the second collars have engaging surfaces facing one another which surfaces are urged into frictional engagement by a bias mechanism to prevent free rotation of the second collar about the shank part. A gaff handle with a bottom opening for accommodating the top end portion of the shank part is fixed to the second collar.

6 Claims, 6 Drawing Figures

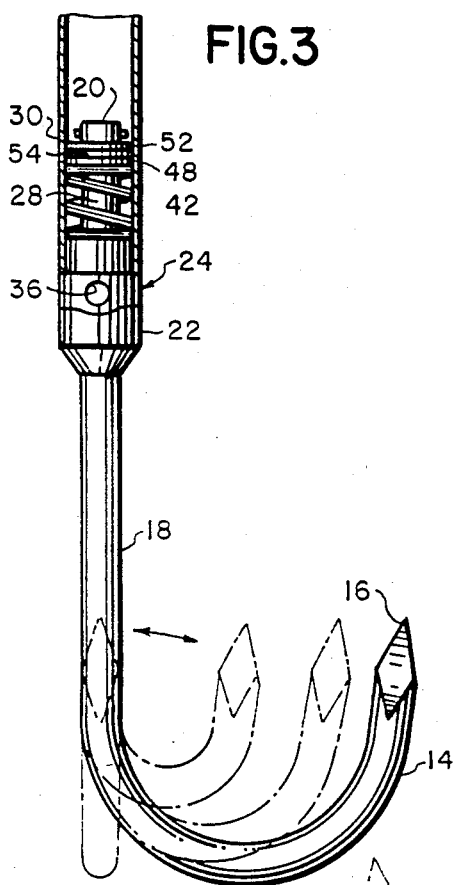
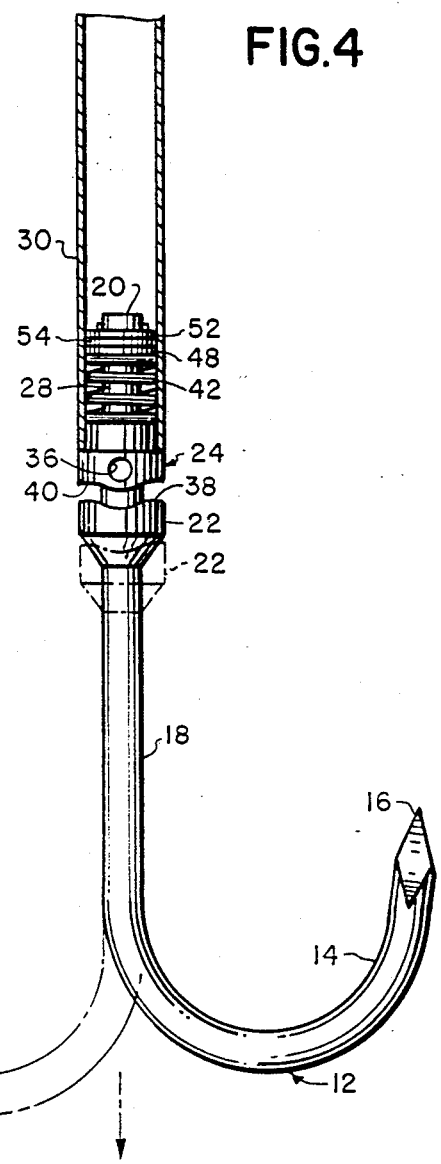
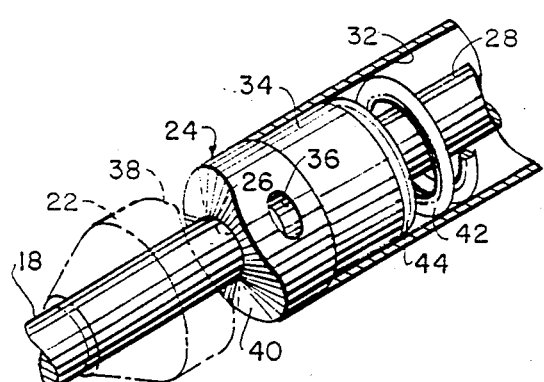
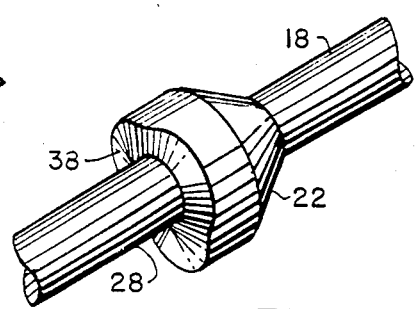

SWIVEL TYPE GAFF HOOK

BACKGROUND OF THE INVENTION

1. Field Of The Invention

The present invention relates generally to gaff hooks, and more particularly to a swivel-type gaff hook in which both swiveling and axial movement of a hook part relative to a handle is controlled through the action of a bias mechanism.

2. Description Of The Known Art

U.S. Pat. No. 1,404,117, issued Jan. 17, 1922, discloses a gaff with a hook capable of swiveling relative to a handle only when a gaffed fish pulls the hook axially out from the handle against the force of a spring. When the fish is removed from the hook, the hook is retracted within the handle by the spring and locked against rotation relative to the handle. Specifically, a toothed conical member fixed to the hook shank meshes with correspondingly tapered teeth formed at the end of the handle from which the hook projects. Since the spring allows the hook to slide out of locking engagement with the handle under the weight of the gaffed fish, the hook is allowed to swivel freely with movements of the fish, according to the patent.

A problem arises, however, when the gaff hook is first applied to a large fish thrashing in the water since jerking movements can deflect the pointed end of the hook away from the fish and, thus, prevent gaffing if the hook is pulled away from the handle a sufficient distance to allow the hook to swivel freely. The only way the hook of the patent can be prevented from assuming a free-swiveling position is to increase the bias force of the spring; but such would limit use of the disclosed hook only to fish of correspondingly greater weight. Further, if the spring force is sufficient to maintain locking engagement between the handle and the hook, twisting or lateral movements of a gaffed fish will tend to jerk the handle out of a fisherman's hands unless he is also pulling on the handle with enough force to counter the action of the spring.

A flying gaff is known from U.S. Pat. No. 3,991,502 issued Nov. 16, 1976. The gaff has a so-called wing member mounted for free rotational movement about a hook shaft by way of a sleeve. The wing member has an opening at a free end for affixing a retrieving line, and a handle is provided which is capable of receiving a tang on the shaft to lock the handle against relative rotation. After a fish is gaffed, the handle is detached and the fish is retrieved by way of the retrieving line, according to the patent. The provision of a handle which must be detached from a hook and laid aside while retrieval of a gaffed fish is performed with a line fixed to a wing member may, however, tend to complicate the whole gaffing procedure.

Conventional gaff hooks are intended for gaffing of relatively large fish such as shark, tuna, and the like (i.e., fish of about fifty pounds or more). Holding onto a good size fish usually requires two strong men. Lateral twisting, turning, and thrashing action imparted to the hook by a gaffed fish either before or after being brought on board a fishing vessel, makes holding onto the handle or shaft of the gaff hook difficult unless swiveling movement of the hook relative to the handle is enabled. Yet, as mentioned, it is essential that the hook remain fixed against rotation relative to the handle when the hook is first applied to the fish, or else the hook will swing away from the fish making gaffing impossible as the fish moves about.

SUMMARY OF THE INVENTION

An object of the invention is to overcome the mentioned shortcomings in the known gaff hooks.

Another object of the invention is to provide a gaff hook capable of reliably gaffing or hooking a fish as it moves about.

A further object of the invention is to provide a gaff hook capable of allowing a gaffed fish to be retrieved while holding onto a hook handle.

According to the invention, a gaff hook includes a rod member with a pointed hook part and a shank part having a top end. A first collar is fixed coaxially to the shank part near the top end and has a first engaging surface facing a top end portion of the shank part. A second collar has a bore for freely receiving the top end portion of the shank part, and has a second engaging surface formed to engage the first collar on the first engaging surface.

Bias means at the top end portion of the shank part urges the second engaging surface of the second collar against the first engaging surface of the first collar with a certain force to prevent free rotation of the second collar about the shank part. A handle has a bottom opening to receive the top end portion of the shank part, and the handle is fixed to the second collar.

Accordingly, without an axial force sufficient to separate the first and the second collars fully against the action of the bias means, the rod member can swivel relative to the handle only when a certain torque sufficient to overcome the force preventing free rotation of the second collar is imparted to the rod member by a hooked object. When an axial or pulling force sufficient to counter the action of the bias means and separate the first and second engaging surfaces is present, the rod member can swivel when a torque substantially less than said certain torque is applied by a hooked object.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In The Drawing:

FIG. 3 is an enlarged view of the hook part in FIG. 1 with parts assembled and a portion of an overlying handle broken away;

FIG. 4 is a view similar to FIG. 3 showing the state of the hook when pulled away from the handle by a hooked object;

FIG. 5 is an enlarged isometric view of a rotatable collar and adjacent parts as seen from line 5—5 in FIG. 2; and FIG. 6 is an enlarged isometric view of a fixed collar as seen from line 6—6 in FIG. 2.

DETAILED DESCRIPTION OF THE INVENTION

Figures 1, 2:
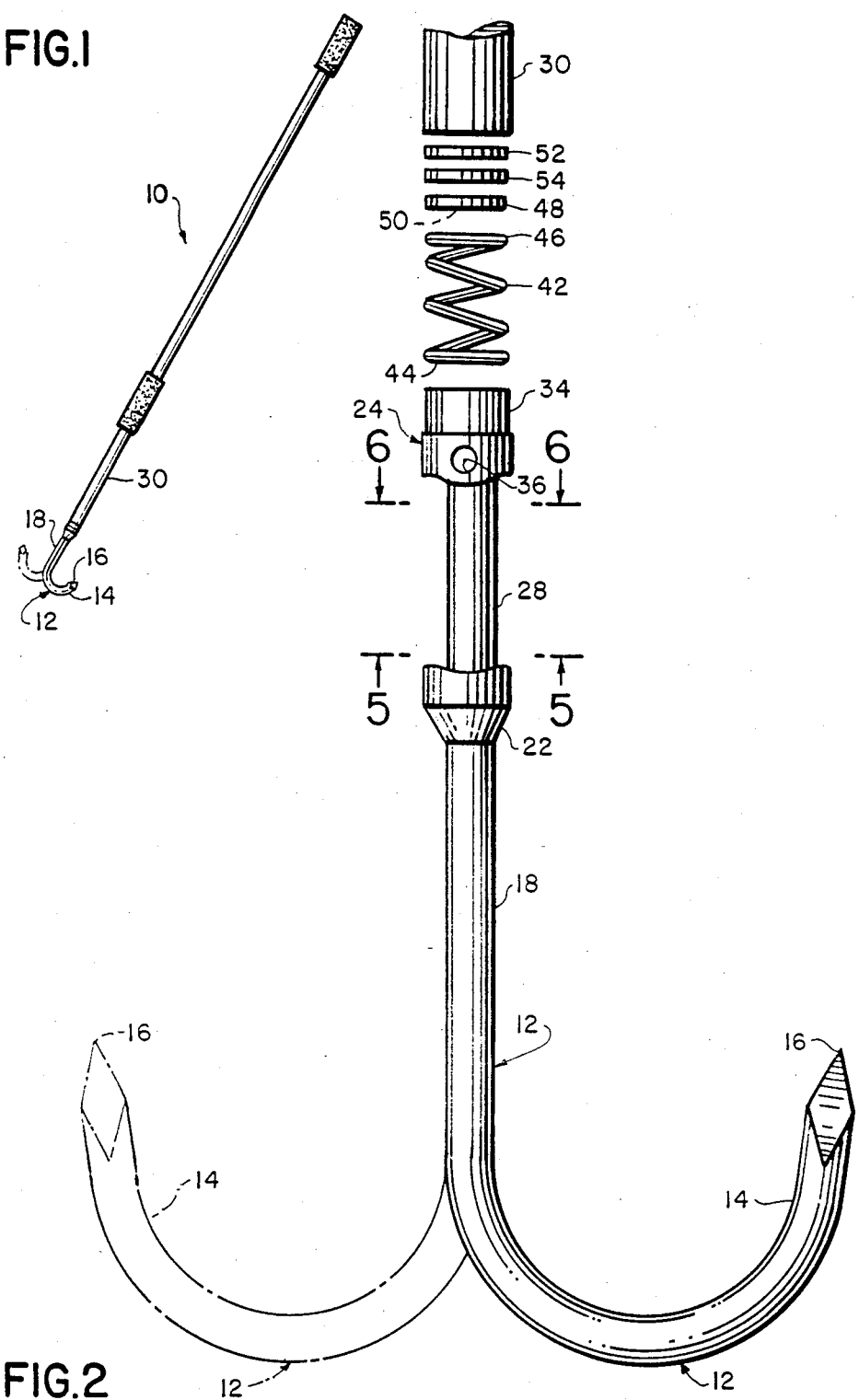
FIG. 1 is an overall view of a gaff hook according to the invention, with swiveling movement of a hook part shown in phantom lines.
FIG. 2 is an enlarged, exploded view of parts at a top end portion of a shank part of the gaff hook in FIG. 1.

FIG. 1 is an overall perspective view of a swivel-type gaff hook 10 according to the invention. The hook 10 includes a rod member 12 having a hook part 14 with a pointed end 16. The rod member 12 also has a shank part 18 extending uniformly from an end of the hook part 14 opposite the pointed end 16 and terminating in a top end 20 shown in FIGS. 3 and 4.

Rod member 12 is formed of a strong, corrosion resistant material such as stainless steel and has a diameter of, for example, about ⅝ inches (1.59 cm.). The overall length L between the top end 20 and the bottom of the hook part 14 may be, for example, 12¾ inches (32.39 cm.) and the breadth B of the hook part 14 may be about 6 inches (15.24 cm.).

The foregoing dimensions for the rod member 12 are not intended to be limitative, and may vary to suit particular applications.

A first generally cylindrical collar 22 is fixed coaxially to the shank part 18 near the top end 20. A second generally cylindrical collar 24 has an axial bore 26 for freely receiving a top end portion 28 of the shank part 18 as shown in FIG. 5. A generally cylindrical handle 30 with a bottom opening 32 (FIG. 5) receives the top end portion 28 of the shank part and is fixed to the second collar 24 as by welding about an upper, reduced diameter section 34 of the second collar 24.

The second collar 24 also has a through bore 36 perpendicular to the axial bore 26 to permit washing out of salt water or other foreign material lodged between the axial bore 26 and the top end portion 28 of the shank part 18 in the assembled state shown in FIG. 3.

The first collar 22 has a first engaging surface 38 facing in the axial direction toward the top end portion 28 of shank part 18, as shown in FIG. 6. The second collar 24 has a second engaging surface 40 facing and formed to engage the first collar 22 on the first engaging surface 38, as seen in FIG. 5.

In the illustrated embodiment, the first and the second engaging surfaces 38, 40 are in the form of complementary camming surfaces. Flat surfaces having friction coefficients sufficiently high to prevent free rotation of the second collar 24 when the latter is urged by a compression coil spring 42 toward the first collar 22, may be substituted for the complementary camming surfaces 38, 40 as will be understood from the following description.

As seen in the exploded view in FIG. 2, spring 42 has a lower end 44 in abutment with the face of the reduced diameter section 34 of the second collar 24, when the parts are in an assembled state as in FIG. 5. The spring 42 has an upper end 46 abutting a lower face of a flat washer 48 having a bore 50 which allows the washer 48 to rotate freely about the top end portion 28 of the shank part 18. Another flat washer 52 is fixed as by welding on the top end portion 28, and a low-friction bearing washer 54 made of, for example, "Teflon+ is sandwiched between the two flat washers 48, 52 to permit rotational movement of the top end portion 28 within the spring 42 during swiveling movement of the rod member 12, as depicted in FIGS. 3 and 4. That is, since the washer 52 is fixed near the top end 20 of the rod member 12 and the handle 30 is fixed to the second collar 24, any swiveling movement of the rod member 12 relative to the handle 30 and second collar 24 is not transmitted to the upper end 46 of the spring 42 due to the slipping action of the bearing washer 54 between the two washers 48, 52.

In the assembled state of FIG. 3, the coil spring 42 applies a force in the range of about 65 to 100 pounds to the second collar 24 in the axial direction. Accordingly, the engaging surfaces 38, 40 of the first and the second collars 22, 24 abut one another with a corresponding force to prevent free rotation of the second collar 24 relative to the top end portion 28 of the shank part 18. Only when a certain "shock" torque sufficient to overcome the force preventing the free rotation of the second collar 24 is applied to the rod member 12 by a hooked object, will the rod member 12 undergo swiveling movement relative to the handle 30. Point contacts will be maintained between the cam engaging surfaces 38, 40 during such shock movement depicted in FIG. 3. The ability of the hook part 14 to swivel only in response to sudden shocks is an important feature of the present invention.

Specifically, unlike conventional swivel-type gaff hooks which permit free rotation when little or no axial force is applied to a hook shank and make gaffing of a large thrashing fish difficult, free swiveling movement of the hook part 14 is prevented at the time of gaffing a fish by the action of the coil spring 42 and the engaging surfaces 38, 40 of the first and the second collars 22, 24. In the illustrated embodiment, the coil spring 42 and the first and the second engaging surfaces 38, 40 cooperate so that a shock torque in the range of about 25 to 30 foot-pounds must be imparted to the rod member 12 to cause swiveling relative to the handle 30 and as long as the collars 22, 24 are not fully separated from one another against the action of the coil spring 42. After gaffing the fish, any twisting or lateral shock force applied to the rod member 12 will, however, be absorbed by a degree of swiveling movement when such forces are enough to overcome the action of spring 42 and the engaging surfaces 38, 40. This "shock absorbing" feature of the hook 10 makes it easier to continue to hold the handle 30 right after gaffing but before lifting a fish out of the water.

Once an axial force sufficient to counter that of the spring 42 is transmitted to the shank part 18 by a gaffed fish (e.g. the "dead" weight of the fish), the engaging surfaces 38, 40 fully separate from one another as shown in FIG. 4, and the hook part 14 can undergo substantially free swiveling movement relative to the handle 30. That is, a torque substantially less than that required when the surfaces 38, 40 contact one another will cause the shank part 18 to rotate within the handle 30. The foregoing torque is determined essentially just by the coefficient of friction between the upper flat washer 52 and the bearing washer 54 when contacting one another with the force of coil spring 42.

While the foregoing description represents a preferred embodiment of the present invention, it will be obvious to those skilled in the art that various changes and modifications may be made, without departing from the spirit and scope of the invention.

I claim:
1. A gaff hook comprising:
   a rod member including a hook part having a pointed end and a shank part extending axially from an end of said hook part opposite said pointed end and terminating in a top end;
   a first generally cylindrical collar fixed coaxially to said shank part near said top end and having a first engaging surface facing in the axial direction toward a top end portion of said shank part;

a second generally cylindrical collar having an axial bore for freely receiving the top end portion of said shank part, said second collar having a second engaging surface facing and formed to engage said first collar on said first engaging surface;

bias means at said top end portion between said second collar and the top end of said shank part, for urging the second engaging surface of said second collar against the first engaging surface of said first collar with a certain force to prevent free rotation of said second collar relative to said shank part; and an elongated handle having a bottom opening for receiving the top end portion of said shank part including said bias means, said handle being fixed to said second collar;

wherein in the absence of an axial force sufficient to separate said first and said second collars fully against the action of said bias means, said rod member can undergo swiveling movement relative to said handle only when a certain torque sufficient to overcome the force preventing the free rotation of said second collar is imparted to said rod member by a hooked object, and in the presence of an axial force sufficient to counter the action of said bias means and separate the first and the second engaging surfaces fully, said rod member can undergo said swiveling movement when a torque substantially less than said certain torque is imparted by said hooked object.

2. A gaff hook according to claim 1, wherein said bias means comprises a compression coil spring having a lower end in abutment with said second collar, and stopper means for fixing an upper end of said spring against axial movement relative to the top end portion of said shank part.

3. A gaff hook according to claim 2, wherein said stopper means comprises a first washer fixed coaxially near the top end of said shank part, a second washer having one side in abutment with the upper end of said coil spring, and a bearing washer sandwiched between said first and said second washers to permit rotational movement of said top end portion relative to said spring during swiveling movement of said rod member.

4. A gaff hook according to claim 1, wherein said bias means is constructed and arranged to apply said certain force in the range of about 65 to 100 pounds to said second collar in the axial direction.

5. A gaff hook according to claim 1, wherein said bias means and said first and said second engaging surfaces are constructed and arranged so that said certain torque is in the range of about 25 to 30 foot-pounds.

6. A gaff hook according to claim 1, wherein said first and said second engaging surfaces are in the form of complementary camming surfaces.

* * * * *